United States Patent
Miyamoto et al.

(10) Patent No.: US 7,115,186 B2
(45) Date of Patent: Oct. 3, 2006

(54) LIQUID MATERIAL EVAPORATION APPARATUS FOR SEMICONDUCTOR MANUFACTURING

(75) Inventors: Hideaki Miyamoto, Kyoto (JP); Wataru Nishida, Kyoto (JP); Tetsuo Shimizu, Kyoto (JP)

(73) Assignee: STEC Inc., Kyoto (JP)

( * ) Notice: Subject to any disclaimer, the term of this patent is extended or adjusted under 35 U.S.C. 154(b) by 458 days.

(21) Appl. No.: 10/386,318

(22) Filed: Mar. 11, 2003

(65) Prior Publication Data
US 2003/0196763 A1    Oct. 23, 2003

(30) Foreign Application Priority Data
Mar. 13, 2002    (JP) ............... 2002-069111

(51) Int. Cl.
*B01D 1/14*    (2006.01)
*B01D 1/30*    (2006.01)
*B01F 3/04*    (2006.01)

(52) U.S. Cl. ............... 159/16.1; 159/44; 118/726; 261/75; 261/95; 261/96; 261/97; 261/DIG. 65; 261/38; 261/62; 261/66

(58) Field of Classification Search ............... 159/4.01, 159/44, 2.1, 16.1; 118/726; 261/75, 95–97, 261/62, 66, 38, DIG. 65
See application file for complete search history.

(56) References Cited

U.S. PATENT DOCUMENTS 4,368,100 A * 1/1983 Pyves et al. ............... 159/48.1
6,162,734 A * 12/2000 Bergman et al. ............ 438/706
6,224,681 B1 * 5/2001 Sivaramakrishnan et al. ............ 118/726
6,752,387 B1 * 6/2004 Nishizato et al. ............ 261/62
6,783,118 B1 * 8/2004 Sivaramakrishnan et al. . 261/62
6,830,608 B1 * 12/2004 Peters ............ 96/272

FOREIGN PATENT DOCUMENTS

JP    11-124674    11/1999
JP    2001-335940    7/2001

* cited by examiner

*Primary Examiner*—Virginia Manoharan

(57) ABSTRACT

A liquid material evaporation apparatus including a mixing chamber, a flow control unit, a first flow passage for introducing a liquid material, a second flow passage for introducing a carrier gas connected to the mixing chamber through a first nozzle, the first nozzle inhibiting backflow from the mixing chamber into the second flow passage. A third flow passage for discharging evaporated mixed gas is connected to the mixing chamber through a second nozzle, the mixed liquid material and carrier gas being forced through the second nozzle by the flow control unit, the mixed liquid material and carrier gas depressurizing after passing through the second nozzle to evaporate into a mixed gas in the third flow passage. Heat is applied to the mixing chamber and the second and third flow passages to enhance mixing in the mixing chamber and to avoid condensation in the third flow passage.

16 Claims, 4 Drawing Sheets

LIQUID MATERIAL EVAPORATION APPARATUS FOR SEMICONDUCTOR MANUFACTURING

This application is based on an application number 2002-069111 filed in Japan, the content of which is hereby incorporated by reference.

BACKGROUND OF THE INVENTION

1. Field of the Invention

The present invention relates to a liquid material evaporation apparatus for use in semiconductor manufacturing.

2. Description of Related Art

FIG. 5 shows the structure of the main portion of a conventional liquid material evaporation apparatus including a gas-liquid mixing chamber, a flow control portion, and a nozzle portion formed into one block for improved evaporation of a liquid material when the block is heated. In this drawing, the main body block 51 is in the shape of a rectangular parallelepiped.

Three flow passages 52, 53, 54 are formed inside the main body block 51. A gas-liquid mixing chamber 55 is formed in the upper surface.

The flow passage 52 is for introducing a liquid material LM (not shown) into the gas-liquid mixing chamber 55, and this liquid material introduction passage 52 is provided in a direction vertical to the surface of the drawing in the shape of a reverse-L character so that one end of the flow passage is opened to the front surface side of the main body block 51 and the other end is opened to the upper surface of the main body block 51. The flow passage 53 is for introducing a carrier gas CG into the gas-liquid mixing chamber 55. The carrier gas introduction flow passage 53 is in the shape of an L character so that one end is opened to the left side surface of the main body block 51 and the other end thereof is opened to a recess portion 51a of the upper surface of the main body block 51. The flow passage 54 functions as a gas discharge passage, with one end opened to the right side surface of the main body block 51, the other end is connected vertically up to an appropriate position of the main body block 51, and the upper end side is coupled to the gas-liquid mixing chamber 55 via a nozzle portion 56.

The gas-liquid mixing chamber 55 is formed so that the recess portion 51a formed on the upper surface of the main body block 51 is covered by a diaphragm 57 as a valve member. The diaphragm 57 is accommodated in a valve block 58 arranged on the upper surface of the main body block 51 and is driven downward towards the mixing chamber by means of a piezo actuator 59 extending upward on the upper portion of the valve block 58. Spring 60 constantly biases the diaphragm 57 upwardly. Heater 61 is for heating the main body block 51.

The nozzle portion 56 is dimensioned so that the diameter and length are 1.0 mm or smaller. The nozzle is located in close proximity to the end of the gas discharge passage 54 closest to the gas-liquid mixing chamber 55. The mixture of the liquid material and carrier gas passes through the nozzle portion 56 into the discharge passage 54 thereby becoming depressurized and evaporating into a mixed gas. This mixed gas flows to the downstream end of the discharge passage 54.

In the liquid material evaporation apparatus of the above-described structure, the liquid material LM and the carrier gas CG are mixed in the gas-liquid mixing chamber 55 provided in the main body block 51 which is heated to an appropriate temperature while the flow of the liquid material LM is controlled, and this gas-liquid mixture is passed through the nozzle portion 56 formed adjacent to the gas-liquid mixing chamber 55 inside the main body block 51. Thus, the liquid material LM contained in the gas-liquid mixture is quickly evaporated by depressurization in a stable state.

However, in a conventional liquid material evaporation apparatus, if the flow rate of the carrier gas CG into the gas-liquid mixing chamber 55 is too low, or if the flow rate of the liquid material LM to the gas-liquid mixing chamber 55 is too high, there is a possibility of backflow of the liquid material LM in which the liquid material LM flows into the carrier gas introduction passage 53 and the liquid material LM cannot be evaporated smoothly at high speeds.

SUMMARY OF THE INVENTION

It is an object of the present invention to provide a liquid material evaporation apparatus in which backflow of the liquid material toward the carrier gas supply passage side is prevented, so that the liquid material can be evaporated smoothly at high speeds.

In order to achieve the above-described object, the liquid material and carrier gas are mixed in a gas-liquid mixing chamber with a control valve providing a flow control function that discharges the gas-liquid mixture through a nozzle portion formed in close proximity to the end of the discharge passage near the gas-liquid mixing chamber. After passing through the nozzle into the discharge passage, the liquid material and carrier gas mixture is depressurized and becomes evaporated. The present invention includes a nozzle for preventing backflow of the liquid material into the carrier gas flow passage.

Since backflow of the liquid material to the carrier gas supply passage side is prevented, and the flow rate of the carrier gas is increased immediately prior the gas-liquid mixing, the gas-liquid mixing is performed more efficiently, and the liquid material is evaporated more smoothly at high speeds. The liquid material is evaporated efficiently, in real time, using the liquid material evaporation apparatus of the present invention.

When the nozzle of the discharge passage and the nozzle of the carrier gas passage have the same dimensions, the structures are symmetrical and it is possible to use the carrier gas supply passage as a gas discharge passage and, conversely, to use the gas discharge passage as a carrier gas supply passage. This symmetry simplifies field installation and may reduce the cost of the apparatus.

BRIEF DESCRIPTION OF THE DRAWINGS

The exact nature of this invention will be readily apparent from consideration of the following detailed description in conjunction with the accompanying drawings, wherein.

DETAILED DESCRIPTION OF THE PREFERRED EMBODIMENTS

Figure 1A:
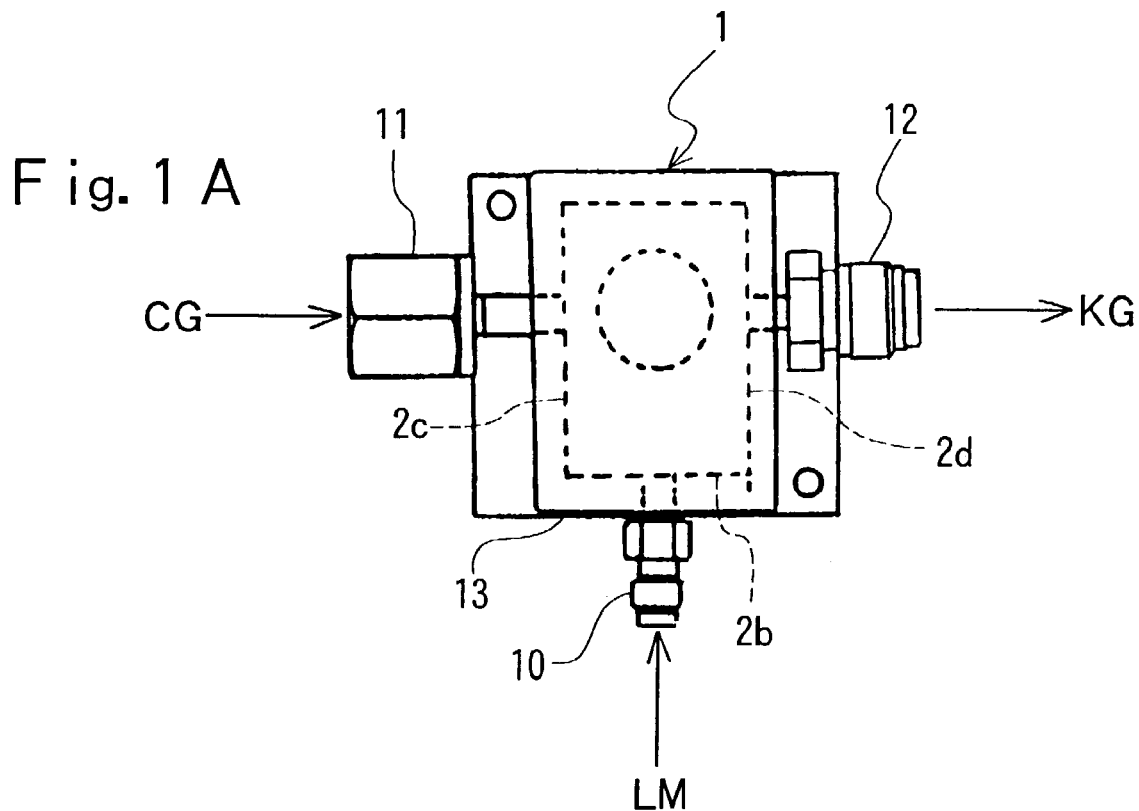
FIG. 1 schematically illustrates one example of the entire structure of a liquid material evaporation apparatus, wherein (A) is a top view and (B) is a front view.

Details of the present invention are explained in reference to the attached drawings that are meant not to limit the disclosure, but rather to illustrate various features. FIGS. 1–4 illustrate one embodiment of the present invention. In reference to FIG. 1, the control valve 1 provides a liquid flow control function. The structure of the control valve 1 is explained referring to FIG. 2 to FIG. 4. The main body block 2 is in the shape of a rectangular parallelepiped constructed from a material with good heat conductivity and corrosion resistance, such as stainless steel. Three flow passages 3, 4, 5 are formed inside the main body block, and a gas-liquid mixing chamber 6 is formed in the upper surface 2a.

The flow passage 3 is for introducing the liquid material LM into a gas-liquid mixing chamber 6, and this liquid material introduction passage 3 is in the shape of an L character so that one end is opened to a front side surface 2b of the main body block 2 and the other end is opened to the gas-liquid mixing chamber 6 in an upper surface 2a of the main body block 2.

The flow passage 4 is for introducing a carrier gas CG into the gas-liquid mixing chamber 6, and this carrier gas introduction passage 4 is in the shape of a reverse-L character so that one end is opened to a left side surface 2c of the main body block 2 and the other end is opened to the gas-liquid mixing chamber 6. A nozzle 7 is formed between the end of the carrier gas introduction passage 4 and the gas-liquid mixing chamber 6, in close proximity to the mixing chamber. The term nozzle includes any narrowing of the conduit, but especially a narrow conduit that has a longer dimension along the direction of flow. The nozzle 7, also called a backflow prevention nozzle, prevents backflow of the liquid material LM into the carrier gas introduction passage 4.

The gas discharge passage 5 is in the shape of an L character so that one end is opened to the right side surface 2d of the main body block 2 and the other end is opened to the gas-liquid mixing chamber 6. A nozzle 8 is formed between the end of the gas discharge passage 5 and the gas-liquid mixing chamber 6, in close proximity to the mixing chamber. This nozzle 8, also called a jetting nozzle, is for evaporating the liquid material LM contained in the gas-liquid mixture by depressurization.

The backflow prevention nozzle portion 7 and the jetting nozzle portion 8 each have the same shape. The inner diameters of the nozzles are considerably small compared with the inner diameters of the carrier gas introduction passage 4 and the gas discharge passage 5, and the lengths are also considerably short. For example, the inner diameters of the nozzles are 1.0 mm or smaller, and the lengths are approximately 1.0 mm.

Heater 9 is for heating the entire main body block 2 to an appropriate temperature and may be composed of a cartridge heater or other suitable heating element. Heating the main body block 2 conducts heat to the mixing chamber, the carrier gas introduction passage 4 and the gas discharge passage 5.

Figure 1B:
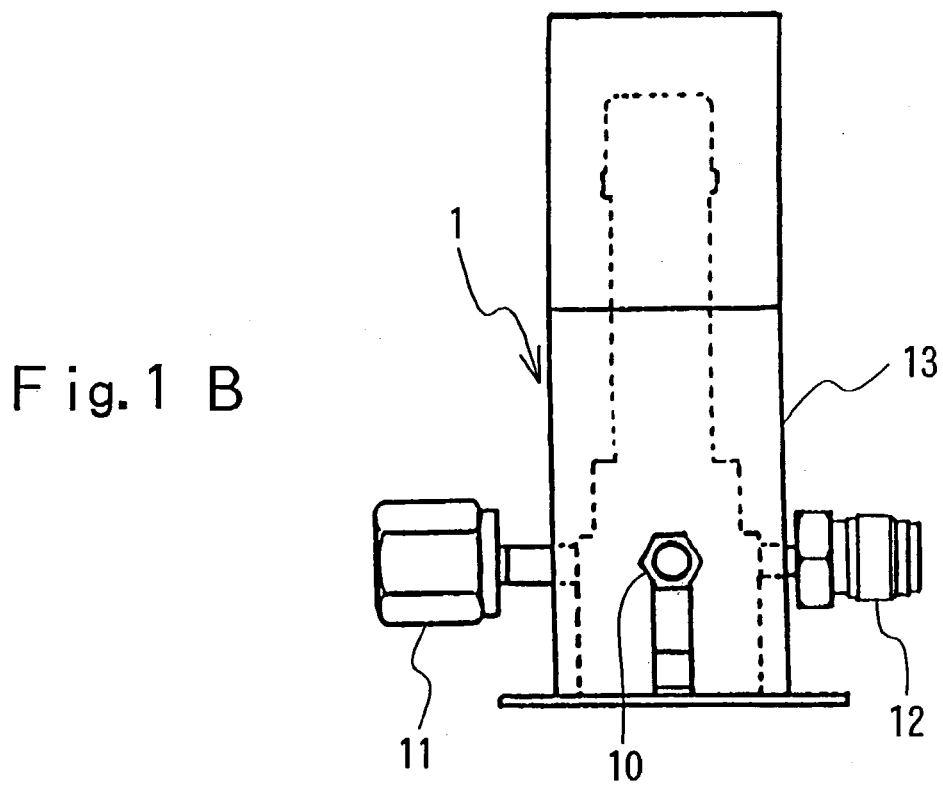
Figure 2:
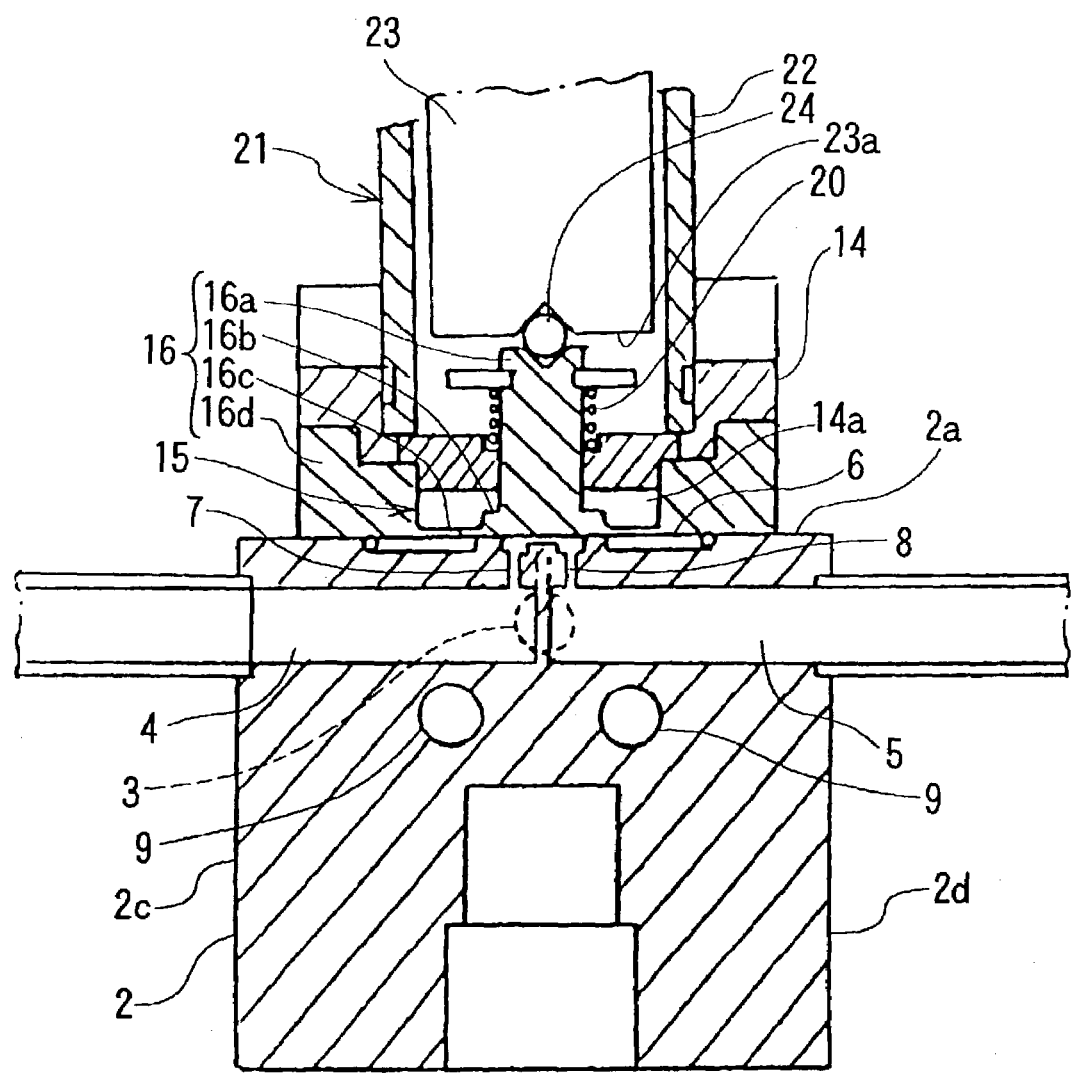
FIG. 2 is an enlarged longitudinal cross-sectional view schematically illustrating the structure of the main portion of the liquid material evaporation apparatus according to the present invention.
Figure 3:
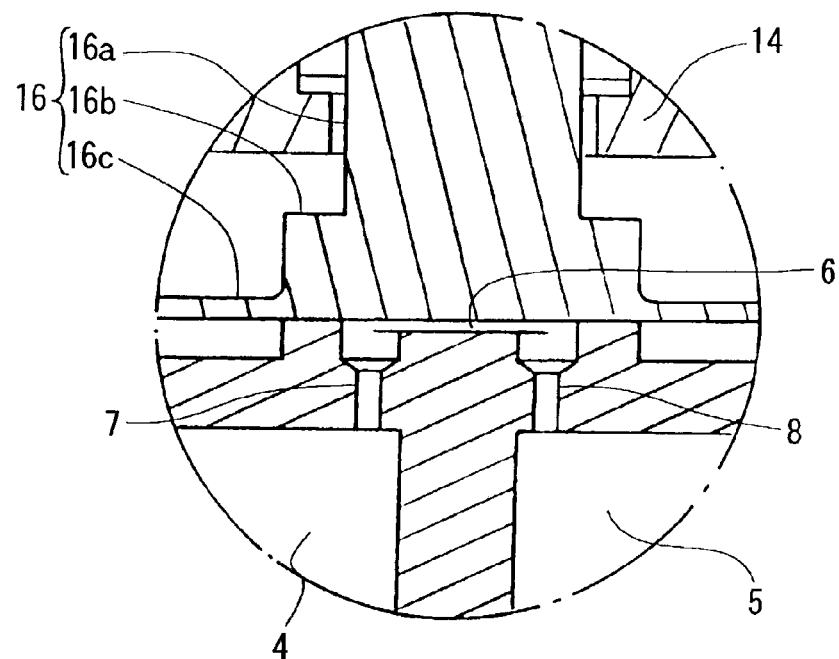
FIG. 3 is an enlarged longitudinal cross-sectional view schematically illustrating the gas-liquid mixing chamber of the liquid material evaporation apparatus.

In reference to FIGS. 1–2, a coupling member 10 is provided on the introduction end of the liquid material introduction passage 3, a coupling member 11 is provided on the introduction end of the carrier gas introduction passage 4, and the coupling member 12 is provided on the discharge end of the gas discharge passage 5. Outside cover 13 covers the liquid material evaporation apparatus 1.

Figure 4:
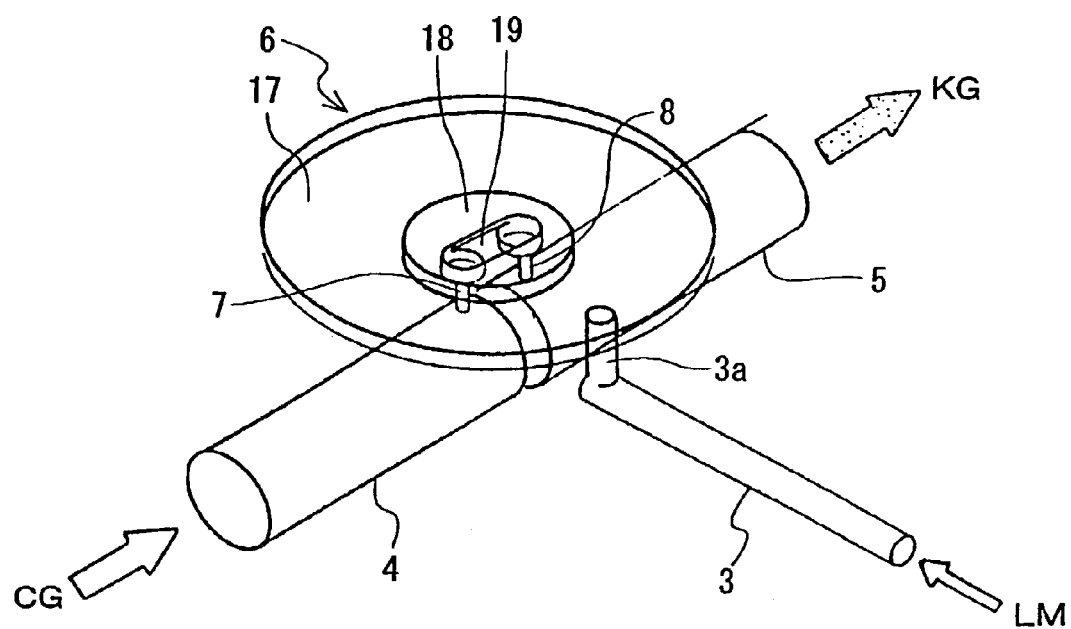
FIG. 4 is a perspective view schematically illustrating the structure of the gas-liquid mixing chamber.
Figure 5:
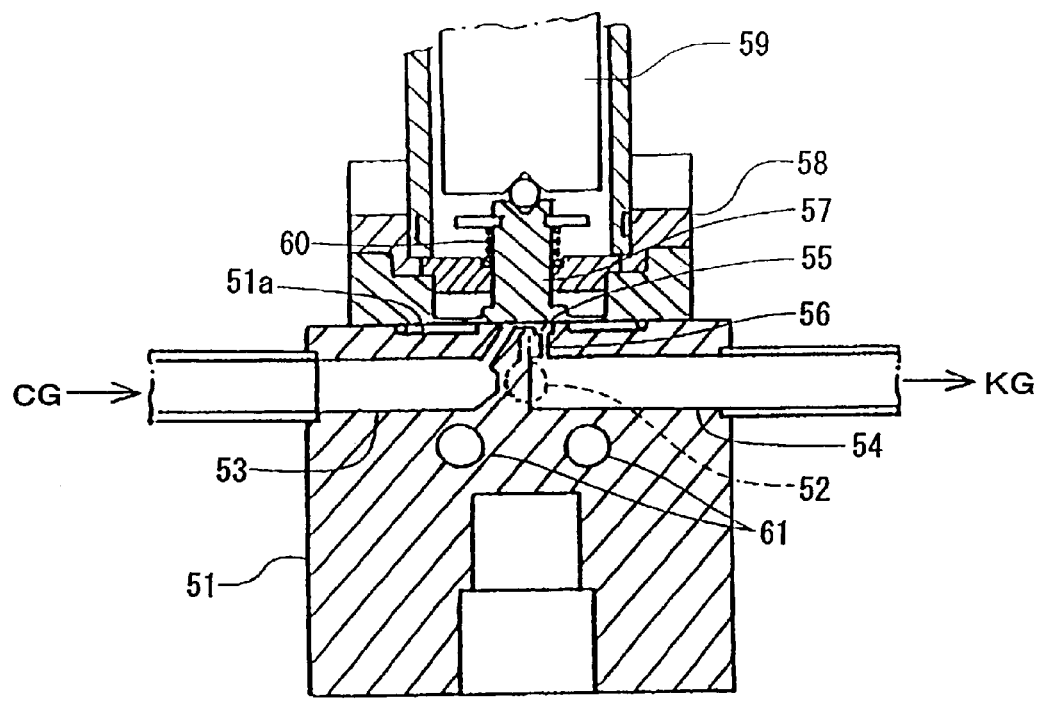
FIG. 5 is a longitudinal cross-sectional view schematically illustrating the prior art.

In reference to FIG. 2 and FIG. 4, the structure of the upper surface 2a of the main body block 2 is explained. The valve block 14 is placed on the upper surface 2a via a suitable seal member (not shown). The valve block 14 is made of a material with excellent heat conductivity and corrosion resistance, such as stainless steel. A valve main body 15 having a liquid flow control function is formed between the valve block 14 and the upper surface 2a. That is, the gas-liquid mixing chamber 6 is formed between the diaphragm 16 and the upper surface 2a, in an inside space 14a of the valve block 14.

The gas-liquid mixing chamber 6 is constructed as follows. A recessed region 17 is formed in the upper surface 2a. A vertical conduit 3a of the liquid material introduction passage 3 is opened to the recessed region 17. A valve sheet 18, which is slightly higher than the recessed region 17, is formed in the center of the recessed region 17. A mixing groove 19 forms the part of the mixing chamber to which the nozzle 7 of the carrier gas introduction passage 4 and the nozzle 8 of the gas discharge passage 5 are connected.

The diaphragm 16 is made of a material with excellent heat and corrosion resistance, with an appropriate elasticity, and is structured in such a manner that a valve 16b, which alternately makes contact with and flexibly moves away from the upper surface of the valve sheet 18, is formed under a shaft portion 16a. A thin wall portion 16c is provided in the periphery of the valve portion 16b, and a heavy wall portion 16d is provided in the periphery of the thin wall portion 16c. In one position, the diaphragm 16 is biased upwardly by means of a spring 20 so that the valve portion 16b is opened and not contacting the valve sheet 18. However, when the piezo actuator 21 is activated, the diaphragm moves to the other position. In this case, when the piezo actuator moves against the shaft portion 16a, the valve 16b is displaced toward the channel groove 19 and the valve 16b contacts the valve sheet 18.

In the present embodiment, a piezo stack 23 formed by layering a plurality of piezoelectric elements in a housing 22 which is extended upwardly on the upper portion of the valve block 14. The piezo actuator is constructed by allowing a pressing portion 23a of a lower portion of this piezo stack 23 to make contact with the upper end of the shaft portion 16a of the diaphragm 16 via a spherical element 24.

The liquid material LM is introduced at a predetermined flow rate into the mixing groove 19 through the liquid material introduction passage 3, and is controlled by the diaphragm 16 driven by the piezo actuator 21. The carrier gas CG is introduced into the mixing groove 19 through the carrier gas introduction passage 4. In this case, since the nozzle 7 is formed near the end of the carrier gas introduction passage 4 in close proximity to the mixing chamber, the carrier gas CG having a predetermined flow velocity is vigorously introduced into the mixing groove 19. Since the mixing groove 19 is a long and narrow groove, and since the carrier gas CG merges with the liquid material LM with great force, the liquid material LM and the carrier gas CG are vigorously mixed in the mixing groove 19 so that both the liquid material and the carrier gas are sufficiently mixed to become a gas-liquid mixture.

Even when the flow rate of the carrier gas CG supplied to the gas-liquid mixing chamber 6 is small, or even when the flow rate of the liquid material LM supplied to the gas-liquid mixing chamber 6 is large, since the backflow prevention nozzle portion 7 is formed in the most downstream end of the carrier gas introduction passage 4, the liquid material LM does not flow into the carrier gas introduction passage 4 side. In this case, the inflow of the liquid material LM into the gas-liquid mixing chamber 6 is not adversely affected.

The carrier gas is supplied at a predetermined pressure. The pressure in the carrier gas introduction passage 4 and the reduced size of the backflow prevention nozzle 7 prevent the backflow of liquid material into the carrier gas introduction passage 4.

The gas-liquid mixture is discharged from the jetting nozzle 8 directly down from the gas-liquid mixing chamber 6 into the gas discharge passage 5. At this time, the liquid material LM and the carrier gas in the gas-liquid mixture are quickly depressurized and become a mixed gas. This mixed gas continues to flow in the gas discharge passage 6 in a direction away from the end of the gas discharge passage that is closest to the mixing chamber. The gas discharge passage 5 is appropriately heated by the heater 9 so that dewfall or condensation does not occur.

The pressure of the carrier gas CG increases in the upstream side of the nozzle 8, and the carrier gas introduction passage 4 is efficiently heated to an appropriate temperature by the heater 9. Thus, not only does the heating efficiency of the carrier gas CG itself increase, but also the liquid material LM is more forcibly mixed with the carrier gas CG through nozzle 8, and the heat transfer from the carrier gas CG to the liquid material LM is efficiently performed. As a result, since the heat transfer efficiency from the heater 9 to the liquid material LM increases, the evaporation efficiency of the liquid material LM also increases. Thus, it becomes possible to increase the flow rate of the evaporated liquid material LM, to decrease the temperature necessary for evaporating the liquid material LM, and to reduce the energy cost of evaporating the liquid material.

Further, in the process of the gas-liquid mixture moving from the gas-liquid mixing chamber 6 to the downstream side of the gas discharge passage 5, the gas concentration of the discharged mixed gas decreases due to the existence of the carrier gas CG. Since the temperature necessary for preventing condensation in the gas discharge passage 5 decreases, the energy cost for heating the gas discharge passage 5 can be reduced. Since the discharged mixed gas is adiabatically expanded, and thus loses heat, usually the evaporation efficiency also decreases. However, in the present embodiment, since the heat that the liquid material LM loses in the adiabatic expansion is compensated by the increased heat of the carrier gas CG that is mixed with the liquid material LM, an improvement in the evaporation efficiency of the liquid material LM is achieved.

When the nozzle of the discharge passage and the nozzle of the carrier gas passage have the same dimensions, the structures are symmetrical and it is possible to use the carrier gas supply passage as a gas discharge passage and, conversely, to use the gas discharge passage as a carrier gas supply passage. This symmetry simplifies field installation and may reduce the cost of the apparatus. However, it is not necessary that the sizes of the nozzle portions 7, 8 are the same dimensions. Different dimensions are acceptable if one flow passage nozzle 7 prevents the backflow of the liquid material LM while other flow passage nozzle 8 evaporates the liquid material LM in the gas-liquid mixture reliably.

What is claimed is:

1. A liquid material evaporation apparatus, comprising:

a source of carrier gas at a first pressure;

a source of liquid material to be evaporated;

a mixing chamber having a recessed region and a mixing groove providing a mixing of liquid material and the carrier gas;

a flow control unit, operatively connected to the mixing chamber for controlling the flow of the liquid material into the mixing chamber;

a heating unit for heating the mixing chamber so that mixing is enhanced;

a first flow passage, connected to the source of liquid material and the mixing chamber, for introducing the liquid material, to the mixing chamber;

a first nozzle;

a second flow passage, connected to the source of carrier gas and the mixing chamber, for introducing the carrier gas, to the mixing groove through the first nozzle, the first nozzle having a flow area size for preventing backflow from the mixing groove into the second flow passage;

a second nozzle;

a third flow passage for discharging evaporated liquid material mixed with the carrier gas, connected to the mixing groove through the second nozzle, having a flow area smaller than an area of the third flow passage area, a flow rate of the mixed liquid material and carrier gas trough the second nozzle is controlled by the flow control unit at a second pressure, the mixed liquid material and carrier gas depressurizing after passing through the second nozzle to evaporate into a mixed gas in the third flow passage, the size of the first nozzle flow area and the relative pressures of the first pressure and the second pressure preventing a backflow of liquid material into the second flow passage.

2. The apparatus of claim 1, wherein the first nozzle and second nozzle have substantially the same dimensions relative to each other.

3. The apparatus of claim 1, wherein the fist nozzle and second nozzle have en inner diameter of 1.0 millimeter or less.

4. The apparatus of claim 1, wherein the inner diameter of the first nozzle is small compared with the inner diameter of the second flow passage.

5. The apparatus of claim 1, wherein the inner diameter of the second nozzle is small compared with the inner diameter of the third flow passage.

6. The apparatus of claim 1, wherein the heating unit heats the third flow passage so that condensation is avoided in the third flow passage.

7. A liquid material evaporation system, comprising:

a source of carrier gas at a first pressure;

a source of liquid material to be evaporated;

a mixing chamber for mixing the liquid material and the carrier gas in a mixing groove;

a flow control unit, operatively connected to the mixing chamber for controlling the flow of liquid material;

a first flow passage, connected to the source of liquid material and the mixing chamber, for introducing the liquid material, to the mixing chamber;

a first nozzle;

a second flow passage for introducing the carrier gas, to the mixing chamber through the first nozzle having a flow area size smaller than a flow area of the second flow passage;

a second nozzle;

a third flow passage for discharging evaporated liquid material mixed with the carrier gas, connected to the mixing chamber through the second nozzle, having a flow area size smaller than a flow area of the third flow passage, the mixed liquid material and carrier gas being forced through the second nozzle at a second pressure, the mixed liquid material and carrier gas depressurizing after passing through the second nozzle to evaporate into a mixed gas in the third flow passage, the size of the first nozzle and the relative pressures of the first pressure and the second pressure preventing a backflow of liquid material into the second flow passage.

8. The system of claim 7, wherein the first nozzle and second nozzle have an inner diameter of 1.0 millimeter or less.

9. The system of claim 7, wherein the inner diameter of the first nozzle is small compared with the inner diameter of the second flow passage.

10. The system of claim 7, wherein the inner diameter of the second nozzle is small compared with the inner diameter of the third flow passage.

11. The system of claim 7, further comprising: a heating unit for heating the mixing chamber.

12. The system of claim 11, wherein the heating unit heats the third flow passage so that condensation is avoided in the third flow passage.

13. A liquid material evaporation system, comprising;
a source of carrier gas at a first pressure;
a source of liquid material to be evaporated;
a body block member having an annular recessed region with a central concentric raised valve sheet portion, the valve sheet portion surrounding a mixing groove;
a heating unit heats the body block member adjacent the annular recessed region to support evaporation;
a first flow passage is connected to the source of liquid material for introducing the liquid material and extends through the body block member to communicate with the annular recessed region;
a flow control unit operatively engaging the valve sheet portion and moving the valve sheet portion to control the flow of liquid material into the mixing groove;
a first nozzle;
a second flow passage is connected to the source of carrier gas for introducing the carrier gas and extends through the body block member and communicates with the mixing groove by the first nozzle having a flow area smaller than an area of the second flow passage, the first nozzle has a flow path axis directed towards the flow control unit; and
a second nozzle;
a third flow passage for discharging evaporated liquid material mixed with the carrier gas from the mixing groove extends trough the body block member and communicates with the mixing groove by the second nozzle having a flow area smaller than an area of the third flow passage area, the second nozzle has a flow path axis directed towards the flow control unit, the mixed liquid material and carrier gas being forced through the second nozzle by the flow control unit at a second pressure, the mixed liquid material and carrier gas depressurizing after passing trough the second nozzle to evaporate into a mixed gas in the third flow passage, the size of the first nozzle flow area and the relative pressure of the first pressure and the second pressure preventing a backflow of liquid material into the second flow passage.

14. The system of claim 13 wherein the first nozzle and second nozzle have the same shape and flow area.

15. The system of claim 13 wherein the mixing groove has an oblong shape with the first nozzle exit at one end and the second nozzle entrance at the other end.

16. The system of claim 15 wherein all of to carrier gas is introduced by the first nozzle exit into the mixing groove and all of the mixed liquid material and carrier gas is released from the mixing groove through the second nozzle.

* * * * *